Feb. 11, 1930.  L. M. PERSONS  1,746,674
REGULATOR
Filed Dec. 24, 1924  6 Sheets-Sheet 1
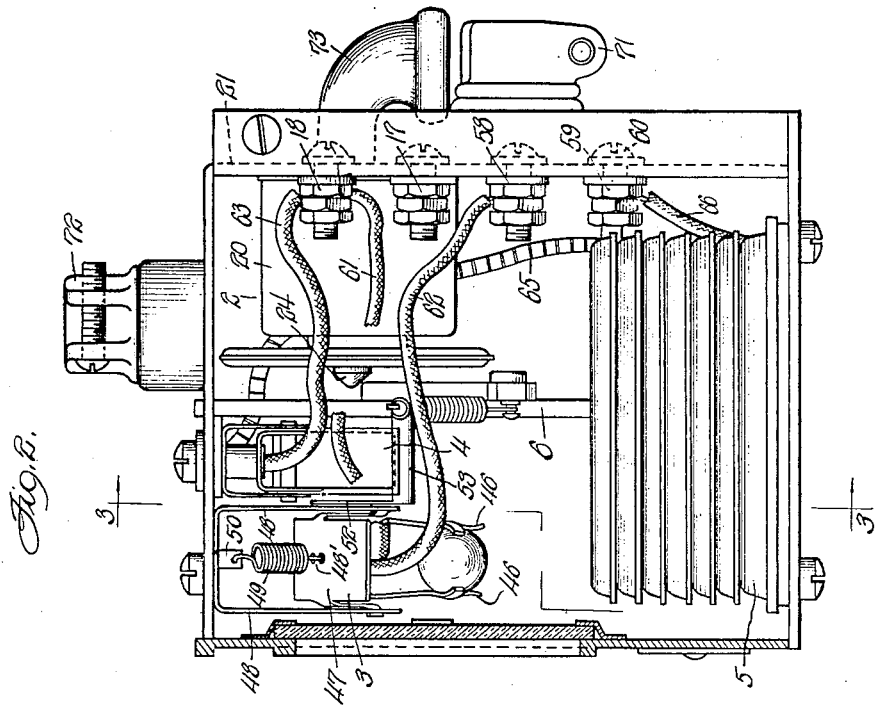

Feb. 11, 1930.  L. M. PERSONS  1,746,674
REGULATOR
Filed Dec. 24, 1924  6 Sheets-Sheet 2
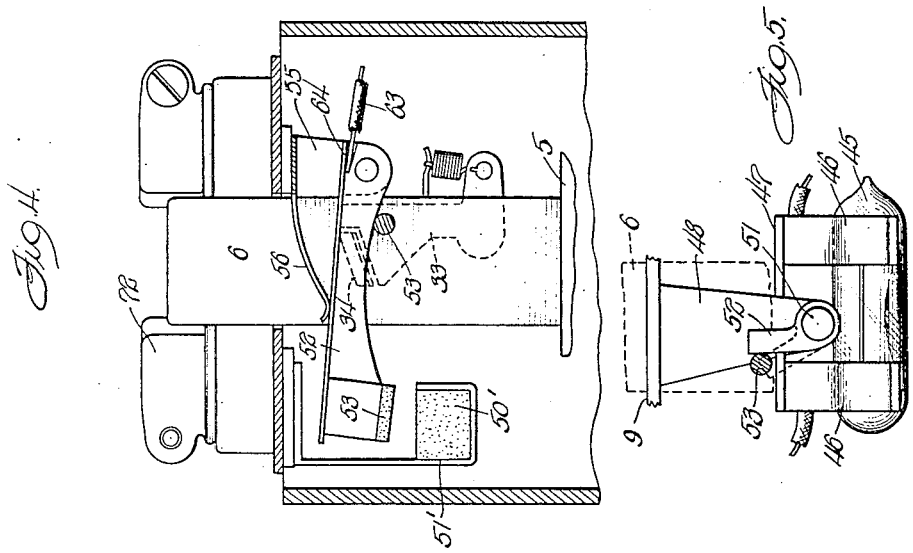
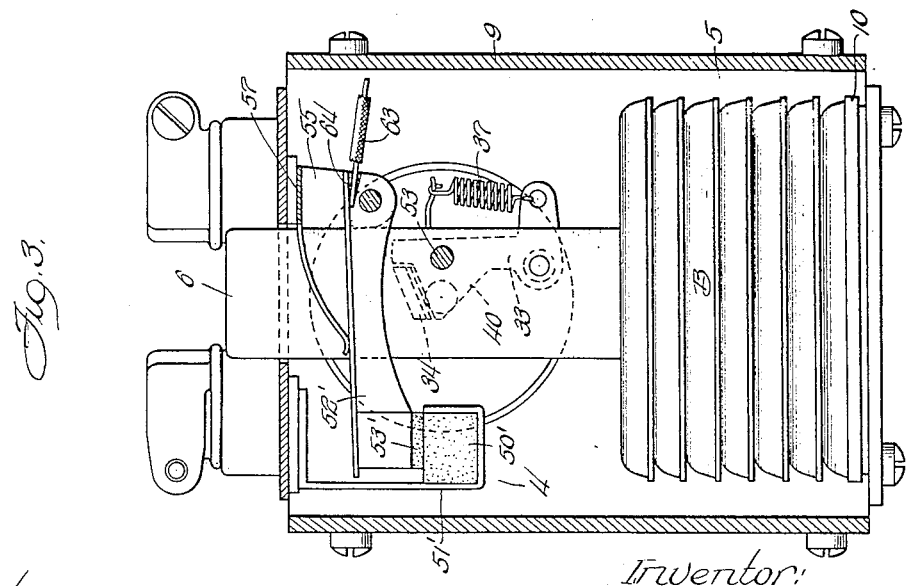

Feb. 11, 1930.  L. M. PERSONS  1,746,674
REGULATOR
Filed Dec. 24, 1924  6 Sheets-Sheet 3
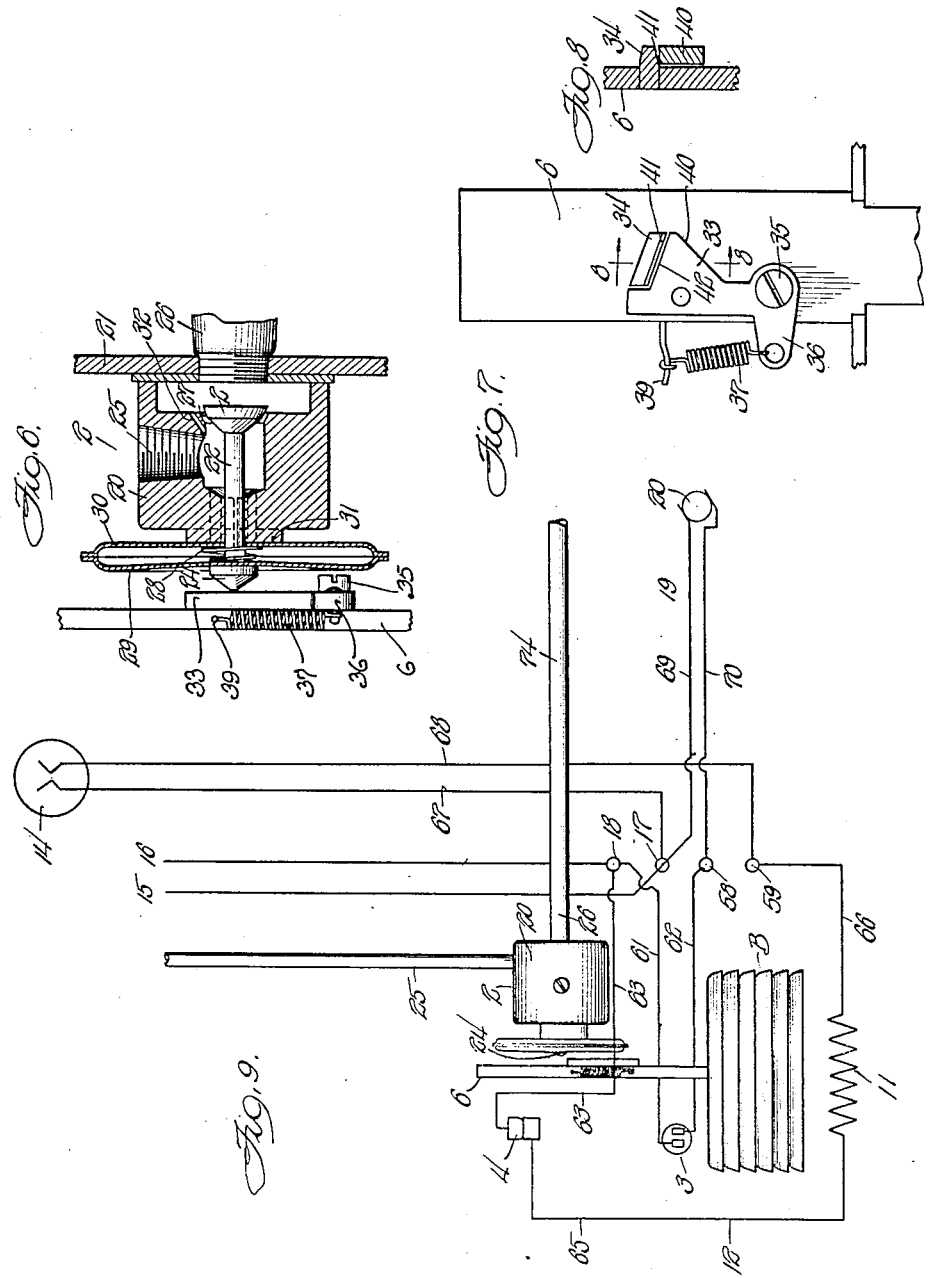
Inventor:
Lawrence M. Persons
By Jones, Addington, Ames & Seibold
Attys.
Witness:
W. K. Olson

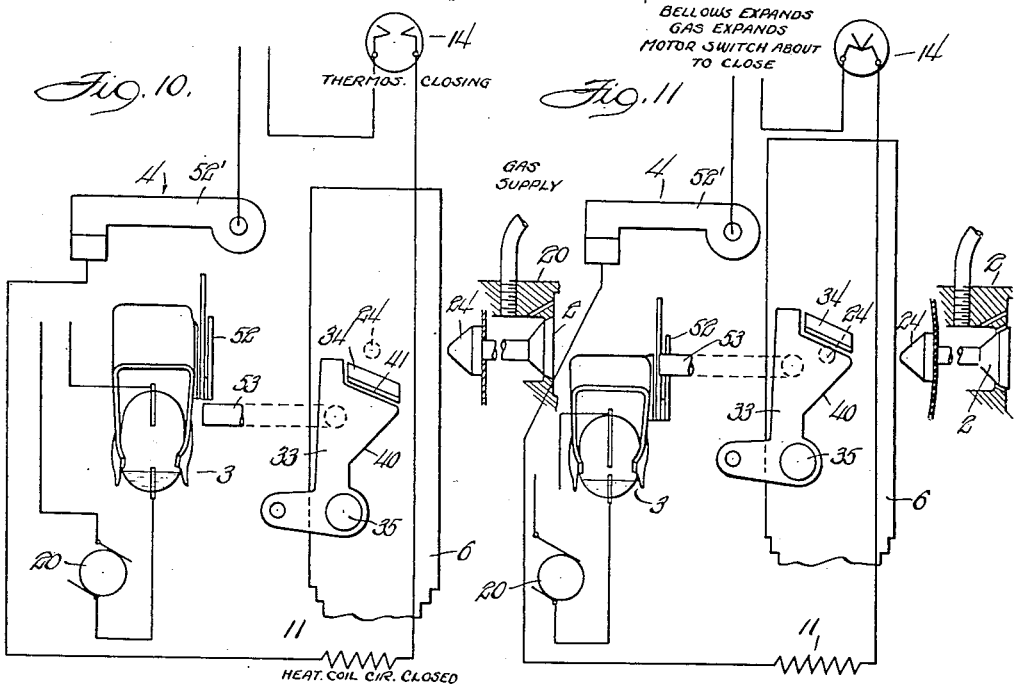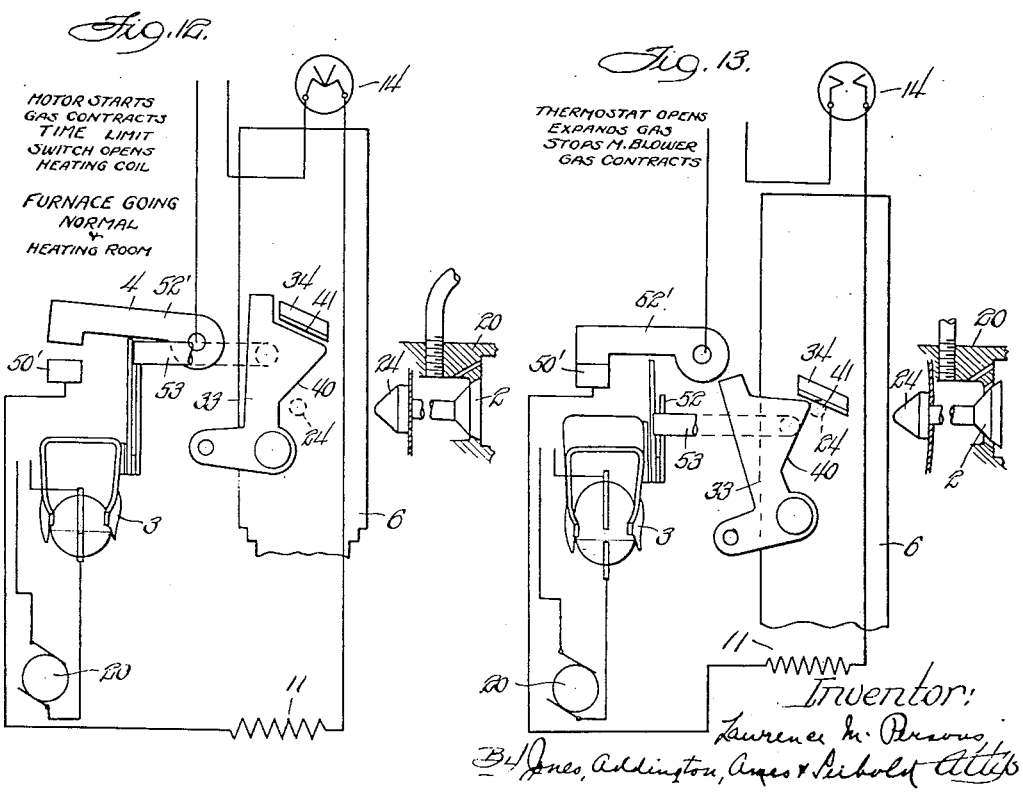

Feb. 11, 1930.  L. M. PERSONS  1,746,674
REGULATOR
Filed Dec. 24, 1924   6 Sheets-Sheet 5
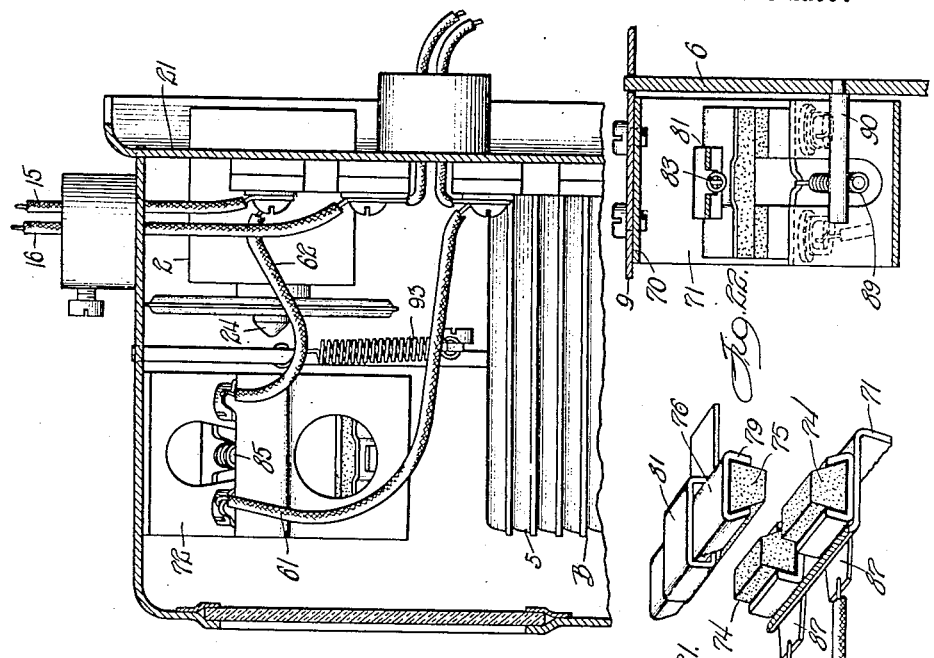

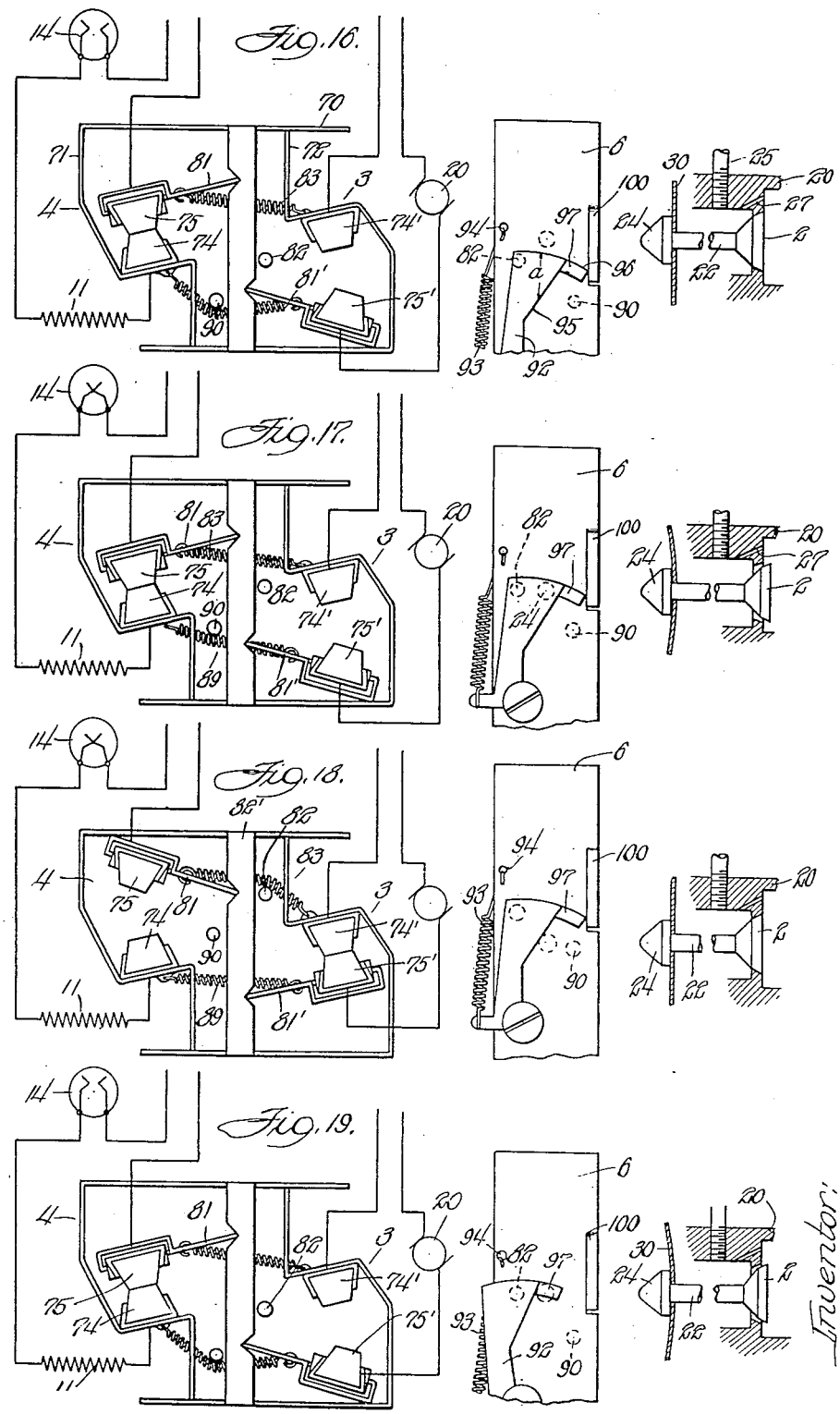

Patented Feb. 11, 1930

1,746,674

UNITED STATES PATENT OFFICE

LAURENCE M. PERSONS, OF CHICAGO, ILLINOIS, ASSIGNOR TO COOK ELECTRIC COMPANY, OF CHICAGO, ILLINOIS, A CORPORATION OF ILLINOIS

REGULATOR

Application filed December 24, 1924. Serial No. 757,966.

My invention relates to automatic time limit regulators. While I have shown and described my invention as being particularly adapted to fuel burning systems, the invention is not to be limited to such use.

My invention is based upon the fact that, in the operation of time limit regulators, the heating effects of the current flow in an electric circuit is the safest and surest way to secure accurately timed movement of controlling members, and that certain results can be obtained by depending upon the development of heat by the current, which can not be obtained through the utilization of the magnetic, or other effects.

I provide a thermally controlled element subject to the heat developed by the flow of current, or a portion thereof, which element functions to operate circuit controlling devices, such as switches, for the motor circuit and the control circuit, and at the same time to actuate a valve member which controls the flow of gas to the pilot flame at the burner. These parts are so arranged as to permit the time limit feature of the thermally controlled element to effect a certain sequence of operations whereby the motor switch will be closed only after the gas valve is operated to increase the flame at the pilot jet, and the control circuit switch opened after the thermally controlled element has travelled its required distance to allow the desired time interval to elapse.

It is an important feature of my invention that the thermally controlled element operates on a time limit principle and preferably does not reach the end of its movement until a certain time interval has elapsed. I find that certain advantages are obtained by the resulting time relation between the operation of said switches and valve member which assures satisfactory operation of the regulator and efficient operation of the fuel burning system.

Consequently this feature of the invention makes the regulator ideal for use in fuel burning systems. As an example, I refer particularly to oil burning systems used for heating buildings, such as homes or residences.

I am aware that it is customary in certain arts to make provision for effecting certain operations in a desired sequence by electrically operated means subject to the current flow.

My invention, however, is fundamentally different, in that the thermally controlled element is subject not to the current flow directly; in fact it has no relation to current flow as such, inasmuch as its movement depends on the heat developed in the circuit by the current flow and is not electrically influenced by it.

I shall now describe my invention more particularly in connection with a fuel burning system. A regulator is employed in fuel burning systems to operate the motor and to regulate the flow of gas to the pilot flame in accordance with the starting and stopping of the motor. The motor functions to run an air blower, which furnishes a supply of air to the liquid fuel to form a combustible mixture. A pilot light is constantly maintained at the nozzle. Usually these systems are automatic and continuous in operation and are controlled by thermostatic means located in the house for maintaining a certain predetermined room temperature. When the temperature falls, however, the thermostat closes the control circuit, thereby causing the current flow to develop heat, which, in turn, results in the movement of the aforesaid thermally controlled element. I find that it is preferable to increase the flow or expand the gas fed to the pilot light before starting the motor, in order to prevent the blower from extinguishing the pilot light. By expanding the gas, it is apparent that the flame may be such that the sudden rush of mixed air and fuel from the blower when starting will not extinguish it. Therefore, it will be noted that a time relation should prevail between the operation of the pilot light and the operation of the motor driven blower when the latter is started.

With the thermostat closed the heat continues to develop and the rise of temperature influences the thermally controlled element. The thermally controlled element is such that it has a predetermined rate of expansion. According to my invention, it serves first to expand the gas and then to close the motor switch. Thereafter, it releases the gas valve to return the normal flow of gas. Preferably to carry out this mode of regulator control, I provide a circuit breaker arranged to open the control circuit when the thermally controlled element reaches the desired limit of movement, thereby destroying the current flow and lowering the temperature. Thereafter, thermally controlled element descends and again closes the control circuit. This acts as a test for the line to determine whether the burner has furnished sufficient heat to raise the room temperature and open the thermostat. If it has not, thermally controlled element again functions to open the circuit breaker and repeats this operation until the thermostat opens the control circuit and permits the motor circuit to open.

While I shall describe the invention as particularly applied to the control of a fuel burning system, it is to be understood that the control may be adapted to various other systems or devices.

In the accompanying drawings, in which I have illustrated several embodiments of the invention:

Figure 1 is a front elevational view of a time limit regulator embodying my invention, the front wall of the housing being removed in order to show more clearly the operating parts thereof;

Fig. 2 is a side elevational view of the same, this view being taken from the right side of the device as positioned in Fig. 1, and a portion of the casing also being removed in order to show more clearly the working parts at the side of the device;

Fig. 3 is a detail sectional view taken on line 3—3 of Fig. 2, illustrating the mounting of the carbon time limit switch which opens and closes the control circuit;

Fig. 4 is a detail view similar to Fig. 3 illustrating the carbon time limit switch in open position, this view being intended to show the manner of operating this switch;

Fig. 5 is a fragmentary detail view of the motor switch and its mounting, and is also intended to illustrate the manner of operating it;

Fig. 6 is a fragmentary detail vertical section of the gas valve, which view is taken through the axis of the valve and illustrates its mode of operation;

Fig. 7 is a detail view illustrating the manner of mounting a gas valve actuating cam member on the upper portion of the thermally controlled element;

Fig. 8 is a sectional view taken on line 8—8 of Fig. 7;

Fig. 9 is a wiring diagram adapted for use in connection with a time limit regulator embodying the features of my invention;

Figs. 10 to 13, inclusive, illustrate a series of diagrammatical lay outs, representing the relative positions of the movable parts of the regulator during the different stages of operation of the latter;

Fig. 14 is a view similar to Fig. 1 illustrating an alternative embodiment of the present invention;

Fig. 15 is a side elevational view of the same;

Figs. 16 to 19, inclusive, illustrate diagrammatic lay outs, similar to Figs. 9 to 13, inclusive, of the relative positions of the various parts during operation of the device;

Fig. 20 is a sectional view taken on line 20—20 of Fig. 14, looking in the direction of the arrows;

Fig. 21 is a detail perspective view of the contact members of the time limit switch shown in Fig. 14; and Fig. 22 is a sectional view taken on line 22—22 of Fig. 14.

Briefly, the time limit regulator embodying my invention comprises a thermally controlled element B, a gas valve 2 and a pair of switches 3 and 4, all of which are adapted to be actuated in a proper time relation by the thermally controlled element during its movement. Thermally controlled element B includes an expansible and contractible bellows 5 provided with a vertically movable bar 6 which is rigidly secured to the top plate 7 of bellows 5. Bar 6 is adapted to have vertical movement as the result of the contraction and expansion of bellows 5. When the circuit is closed, the bellows 5 will, of course, expand and the bar 6 will thus move to actuate the valve 2 and the switches 3 and 4 in proper sequence. Switch 3 functions to open and close a motor circuit, while switch 4 is in the nature of a time limit switch adapted to open and limit the movement of the thermally controlled element, and in a certain aspect serves to test the circuit in order to determine whether the burner (not shown) has been operating a time sufficient to raise the temperature of the room, in which the usual thermostat is located for automatically controlling the fuel burning system.

It is preferable to have the thermally controlled element B first open the gas valve and thereafter close the motor circuit. However, I wish to point out that a time interval should elapse between these two operations which is long enough to prevent the sudden rush of fuel mixture at high velocity from the blower from extinguishing the pilot light before an increased flow of gas is furnished. After the pilot flame is of a size sufficient to withstand the high velocity flow of the mixture, the thermally controlled element may close the motor circuit by actuating the motor switch 3 and concurrently hold the gas valve open for a period of time sufficient to allow the mixture to ignite and continue to burn at the nozzle. Ordinarily, the gas valve will be held open by the thermally controlled element, say for a period of approximately fifty-five seconds, the initial opening of the gas valve being ten seconds in advance of the closing of the motor circuit by switch 3. I find that a period of forty-five seconds is long enough to allow the mixture to ignite and continue to burn without relying further on the pilot light.

The next step in the operation of my device is to limit the advancing movement of the thermally controlled element while the room temperature is being raised to a point where the thermostat may open. Thermally controlled element B accomplishes this feature by opening the carbon time limit switch 4 temporarily to cool the heating element so as to return the thermally controlled element a limited distance. Such return movement of element B causes the switch 4 to close, and hence, if the thermostat has not opened the circuit, the current flow will immediately build up the heat at the heating element and cause the thermally controlled element B to advance and reopen switch 4.

My device will now be described more specifically in detail. The expansible and contractible bellows 5 is secured to a base 1 of housing 9, and interposed between the base and the bellows is a heating plate 10 having a resistance coil or heating coil 11 imbedded therein. Screws 11' thread upwardly into the base 8 and are employed to hold bellows 5 and heating plate 10 in position within housing 9.

As indicated in Fig. 9, wherein I have illustrated a wiring diagram for my device, heating coil 11 is inserted in series in a control circuit 12, which includes a room thermostat 14 and the carbon time limit switch 4, also inserted in series. The line wires 15 and 16 are connected to contacts 17 and 18, respectively. At these contacts 17 and 18, a motor circuit 19 is connected, thereby placing both circuits in parallel. The switch 3 is inserted in series in the motor circuit to open and close the same. Thermostat 14 primarily serves to control the circuit 12, the switch 4 being provided as a means for opening and closing this circuit to limit the expansion of bellows 5 while the thermostat is closed and the motor 20 is running.

A valve housing 20, in which the valve 2 is contained, may be secured to the rear wall 21 of regulator housing 9. Valve 2 is provided with a stem 22 which, at the outer end may have a cam engaging head 24. Within the valve housing 20, two chambers are furnished, one to communicate with an inlet port 25 and the other to communicate with the discharge port, into which threads a gas pipe 26 leading to the pilot light of the burner. Between these chambers a valve seat 27 is formed for receiving the valve 2 when closed. I provide an improved form of packing for the valve stem adjacent the cam engaging head 24. This packing is in the form of two flexible disks, which, when placed together and secured about their periphery, form a closed housing to accommodate an expansion spring 28. The walls of this housing are flexible and may be forced away from each other by spring 28. The arrangement is such that, when the spring 28 is permitted to expand, it tends to force the wall 29 away from the wall 30, and, by doing so, seats the valve 2 and simultaneously forces the wall 30 tightly against face 31 of housing 20. Opening the valve 2 does not lessen its ability to maintain a fluid-tight joint, as the wall 29 is moved inwardly, thereby forcing spring 28 against wall 30 and in turn causing the latter tightly to abut against the casing wall 31. In order to maintain continuously a limited flow of gas to the pilot light, a small port 32 is furnished at one side of the valve seat 21 to keep the two chambers in communication with each other.

Cam engaging head 24 tapers to form a pointed tip adapted to engage a movable cam member 33 as well as a stationary cam member 34, both mounted on the vertical movable bellows member 6. Movable cam member 33 is pivoted at 35 and has an outwardly extending arm 36 for receiving one end of a coil spring 37. The other end of coil spring 37 is attached to a projection 39 on member 6. Cam member 33 is provided with an inclined cam surface 40, which is adapted to be engaged by head 24, during the downward travel of bellows member 6, for moving the cam member 33 to the left against the tension of spring 37. Stationary cam 34 is mounted on member 6 at a slight angle and is provided with a beveled cam edge 41. Cam 33 may have a cooperating angular edge 42 on the side adjacent to the cam edge 41, so that during the upward travel of bellows member 6, the head 24 may ride over the cams 34 and 33, thereby moving the head inwardly and unseating valve 2. With the movable cam 33 arranged in the manner shown, the head 24 may be caused to move thereover, when the bellows member 6 advances. Head 24 is first engaged by the stationary cam 34 and caused to move inwardly to unseat the valve 2. The time taken for head 24 to travel over cam 34 is approximately ten seconds, while the time taken for it to travel over the cam 33 is approximately forty-five seconds. On the downward movement of bellows member 6, the time is not as great, because the head 24, when engaging cam surface 40, flips cam 33 to the left. Head 24 is, therefore, not moved inwardly to unseat the valve until it engages the cam 34.

It will be noted in Figs. 1 and 5, that the motor switch 3 is of the mercury contactor type, and consists of a glass tube 45 sealed at its ends and suitably furnished with electrodes therein and a body of mercury for making and breaking contact between the electrodes. The glass tube 45 is supported by spring clips 46 upon a movable carriage 47. This carriage 47 is mounted in depending bracket arms 48 secured to the top of regulator casing 9. By referring to Fig. 2, it will be noted that carriage 47 is provided with an opening 48' through which one end of a coil spring 49 passes and is secured. At the other end, the coil spring is fastened to a lug 50 on bracket 48. Normally, the spring 49 holds the motor switch in open position, as illustrated in Fig. 1. Carriage 47 is fixed to a pivot 51 which is rotatably supported in the inner depending bracket arm 48. A finger 52 is also fixed to pivot 51, so as to cause it to rotate when the finger is rotated.

In Fig. 5, it will be noted that arm 52 is adapted to be engaged by a pin 53. Pin 53 laterally projects, in fixed relation, from the bellows member 6. After member 6 has advanced a predetermined distance upwardly upon expansion of bellows 5, the pin 53 will engage finger 52 and rotate the switch to the left against the tension of spring 49, thereby closing the switch. Spring 49 will, of course, return the switch to its normal position as soon as pin 53 is withdrawn from engagement with finger 52.

In Figs. 3 and 4, I have illustrated the manner of mounting the carbon time limit switch 4. This switch comprises a carbon block 50' carried by a depending member 51', which member is secured to the under side of the top wall of regulator housing 9. A movable contact arm 52' makes and breaks the circuit by contacting with carbon block 50'. Contact arm 52' comprises a cooperating carbon block 53' and may be pivoted to a depending bracket 55. A leaf spring 56 tends to press contact arm 52' into engagement with carbon block 50'. Leaf spring 56 has one end secured at 57 and the other end engaging contact arm 52'. Pin 53, in its advancing movement, is adapted to engage the under side of arm 52' to move it upwardly against the tension of leaf spring 56. This movement, however, does not occur until pin 53 has opened the motor switch 3 by engaging arm 52 fixed to the mercury switch pivot 51.

In Figs. 1 and 2, I have illustrated the manner of arranging the lead wires within regulator housing 9. A plurality of terminals 17, 18, 58 and 59 are fastened to the rear wall 21 of the housing 9. These terminals are in the form of screws 60 projecting inwardly through the housing and having suitable nuts thereon to hold the wires in position. The line wires 15 and 16 connect to the terminals 17 and 18 respectively (see Fig. 9). Wires 61 and 62, extending from the mercury switch, connect to the terminals 18 and 58, respectively. A wire 63 extending from terminal 18 connects at 64 (see Fig. 3) to the movable contact arm 52' of carbon time limit switch 4. The opposite side of this control circuit 2 extends from the switch 4 by means of a wire 65 leading to heat coil 11. A wire 66 completes this circuit, and, as will be seen in Figs. 2 and 9, connects to terminal 59. Wires 67 and 68, connecting the thermostat 14 in circuit, extend from the terminals 17 and 59. The motor circuit wires 69 and 70 extend from the terminals 17 and 58, respectively. Suitable B X couplings 71 and 72 are provided to serve as means for connecting the various wires in circuit with the above mentioned terminals. I have also employed an elbow pipe coupling 73, which may serve suitably to connect the gas connection 74 extending to the pilot flame. In Fig. 6, the inner end of this coupling 73 has been designated 26.

In order to facilitate the explanation of the various steps of operation which my device undergoes, I have diagrammatically illustrated, in Figs. 10 to 13, inclusive, the different positions assumed by the various parts during operation. In Fig. 10, the device is shown idle with the thermostat 14 closing. During this time, the motor switch 3 is open and the carbon time limit switch 4 is closed. As soon as the thermostat 14 closes (see Fig. 11), the current flow develops heat at the coil 11. With this condition existing, the highly volatile gas within the expansible and contractible bellows 5 will expand and cause the bellows, in turn, to expand. Member 6 is thus moved upwardly. It will be first noted that, before this movement occurs, the cam engaging valve head 24 is located above the cam members 34 and 33. However, when member 6 advances, head 24 is first engaged by the stationary cam 34 and moved inwardly to open the gas valve 2.

The flow of gas to the pilot light at the burner immediately expands to increase the flame. During the time that head 24 is traveling over the surface of cams 34 and 33, the pin 53 engages the mercury switch arm 52 and tilts this mercury switch to the left and closes the motor circuit. The relation between the closing of the switch and the operation of valve 2 is such that valve 2 remains open approximately forty-five seconds after the motor switch has been closed, thus overcoming the possibility of the flame being extinguished before the mixture has been given an opportunity to remain ignited at the burner.

Assume now that the fuel burning system is in the full operation and the burner through the heater is supplying heat to the house. The thermostat 14 will, of course, not open until the room temperature has reached a predetermined point. It is desirable, therefore, to provide means for testing the control circuit 12 and limiting the expansion of the bellows 5 until this thermostat 14 opens. Bellows 5 of thermally controlled element B continues to expand as long as heat is furnished by the current flowing through heat coil 11. Bellows member 6, therefore, continues to advance and permits its pin 53 to engage contact arm 52' of the carbon time limit switch 4. Contact arm 52' is moved upwardly against the tension of spring 56 to open the switch. This breaks the circuit and discontinues the current flow. Coil 11 then cools and in turn allows bellows 5 to cool. Bellows member 6 immediately returns and withdraws its pin 53 out of engagement with spring pressed contact arm 52' of switch 4. This switch is thus closed, and, if the control circuit 12 has not been open, at this time, by thermostat 14, the current will again flow through the circuit and develop heat at coil 11. The bellows again expands and through its member 6, the pin 53 opens the carbon time limit switch 4. This operation is repeated until the thermostat 14 opens and thereby breaks the circuit.

Bellows member 6, when moving downwardly to the position it assumes when the system is idle, brings the movable cam 33 into engagement with head 24. This time, however, the cam surface 40 engages head 24 and causes the cam itself to move to the left against the tension of its spring 37. By means of this arrangement, the head 24 is not moved inwardly to unseat gas valve 2 until it engages cam surface 41 and cam 34. At the moment this engagement occurs, the pin 53 on bellows member 6 moves out of engagement with finger 52. Spring 49 then moves the motor switch 3 to open position with the valve 2 still open. During this operation, the pilot flame is expanded to prevent the motor, when stopping, from extinguishing it. When the motor stops, however, the gas is contracted to return the pilot flame to its normal size. This occurs, when the head 24 is released, by moving the head out of engagement with the cam member 34.

In the alternative embodiment of my invention illustrated in Figs. 14 to 22, inclusive, I employ substantially the same construction, with the exception of the motor switch 3, carbon time limit switch 4 and gas valve cam. However, the general arrangement and principle of operation of the structure is unchanged. By referring more particularly to Figure 14, it will be observed that a plate 70 is secured to the upper wall of regulator housing 9. Plate 70 is provided with two depending arms 71 and 72 which may be interconnected, if so desired at their ends as indicated at 73. Arm 71 serves to carry the time limit switch 4. Arm 72 serves to carry the motor switch 3.

In this embodiment, the time limit switch 4 comprises a pair of carbon blocks 74 adapted to be bridged by a movable carbon block 75 (see Fig. 21). The block 75 is seated, in electrically insulated relation, in a member 76. As is illustrated in Figure 20, the sides of the member 76, substantially at their centers, are extended downwardly in a straight line instead of being bent at an angle as indicated at 79 to embrace the sides of block 75. The central portions 78 are then apertured to receive projections 80 which serve as pivots for this part of the switch. Projections 80 are formed from a movable arm 81 having a pivotal mounting, in the form of a point contact, on a central depending interconnecting frame member 82'. As will be later explained, a pin 82 laterally extending from bellows member 6 of the thermally controlled element B is adapted to engage a coil spring 83, in the upward movement of member 6, for biasing this spring 83 past dead center to cause the carbon block 75 to move upwardly and thereby break the circuit between the carbon blocks 74.

Carbon blocks 74 are inserted in the control circuit 12 by means of the wires 63 and 65. The wire 65 is connected to heat coil 11 as indicated at 83', at the base of the bellows 5, while the wire 63 is connected to the terminal 18 on the rear wall 21 of housing 9.

Spring 83 has one of its ends connecting to the pivotally mounted arm 81, as indicated at 84, and the other end connecting to the depending frame arm 72, this being illustrated in Fig. 15 at 85. I prefer providing a loose mounting for the carbon contact 75. This mounting allows carbon contact 75 to have a limited rocking movement in a longitudinal direction on pivots 80, so as to be self adjustable when seating upon carbon contacts 74.

By referring to Fig. 14, it will be observed that screws 86 are furnished for the purpose of providing electrical contact between conductor bars 87 and the carbon contacts 74. An insulation washer 88 separates bars 87 from contact with depending frame arm 71. Lead wires 63 and 65 are adapted to be secured to the respective ends of conductor bars 87 as illustrated in Fig. 21.

As hereinbefore mentioned, arm 72 serves to carry the motor switch 3. The construction of this motor switch is substantially the same as that of the time limit switch or circuit breaker 4. The only difference to be noted is that the movable arm 81' carrying the bridging carbon contact member 75' is, in this instance, disposed below the carbon contacts 74'. A coil spring 89 is furnished to move arm 81' into engagement with carbon contacts 74' to close the motor circuit. One end of spring 89 connects to the depending frame arm 71 in the same manner as spring 83 connects to one end of the depending frame arm 72. The opposite end of spring 89 connects to the arm 81' in a manner similar to the connection between the arm 81 and spring 83. Normally, the spring 89 tends to hold the carbon contact 75' in engagement with carbon contacts 74', thereby closing the motor circuit. The circuit is broken, however, by means of a transversely extending pin 90 on bellows member 6 of the thermally controlled element B. Pin 90 serves to engage the spring 89, on the downward movement of member 6, so as to force this spring past dead center, whereupon the contact member 75' will break the circuit by a snap action. This feature provides a quick make and break between the carbon contacts and thereby reduces arcing to a minimum. In the motor switch 3, I have also provided the carbon contact 75' with the aforesaid self adjusting feature, so that, when brought into engagement with the carbon contact 74', it will adapt itself to these contacts and obtain a maximum surface engagement therewith. Carbon contacts 74' are provided with screws 86' which place the conductor bars 87' in electrical contact with the carbon contacts 74'. Wires 61 and 62 are attached to the conductor bars 87' in a manner similar to that illustrated in Fig. 21. The opposite ends of these wires 61 and 62 connect to the terminals 18 and 58. In Fig. 14, it will be noted that the motor circuit wires 69 and 70 lead from these terminals 17 and 58 through an opening 90' in the rear wall 21 of housing 9. Line wires 15 and 16 extend upwardly from terminals 18 and 17 respectively, leaving housing 9 through the top thereof.

In this embodiment, I have illustrated an alternative form of cam structure which cooperates with cam engaging head 24 for operating gas valve 2. Referring to Fig. 16, a cam 92 is pivotally mounted on bellows member 6 and is normally held in position by means of a spring 93, one end of which connects to the lower end of the cam and the other end of which connects at 94 to member 6. Cam member 92 is provided with a camming edge 95 and a projection 96, which has a cam surface 97. The distance represented by line 'a' on cam 92 is approximately three times that of the width of cam surface 97. Thus, it will be noted that the cam engaging head 24 when passing over the surface represented by line 'a' will be depressed to hold valve 2 open a longer time than when it passes over the cam surface 97. When the motor is closed, this cam engaging head 24 is arranged to have advanced approximately one-third of the distance represented by line 'a', so that the motor driven blower may not extinguish the pilot flame when the blower is first operated. Downward or return movement of bellows member 6 will, however, bring cam engaging head 24 in contact with cam edge 95 whereby cam 92 is forced to the left against the tension of spring 93. Cam engaging head 24 is preferably not depressed to open the valve 2 until it comes in contact with the cam surface 97, whereupon it is depressed for a predetermined period of time to allow the valve 2 to open in order to increase the pilot flame and prevent the stopping of the motor driven blower from extinguishing the pilot light.

In Figs. 16 to 19, inclusive, I have illustrated the various steps of operation which my regulator undergoes during the time the thermostat 14 closes and opens. In Fig. 16, the time limit switch 4 is illustrated at the left and the motor switch is illustrated at the right, the former being closed and the latter being open, thereby indicating that the device is not operating. Assume now that the thermostat 14 closes and the current flowing through the control circuit 12 is generating heat at heat coil 11 and that the bellows 5 has started to expand to move the member 6 upwardly. As illustrated in Fig. 17, the first stage in the operation will result in cam engaging head 24 engaging cam 92 to open gas valve 2. Pin 90 will also move upwardly and gradually allow the spring 89 to approach dead center position, which preferably does not occur however, until cam engaging head 24 has advanced approximately one-third of the distance across the face of cam 92, which distance is represented by line 'a' in Fig. 16. Continued upward movement of bellows member 6, moves pin 90 out of engagement with spring 89, thereby allowing spring 89 to move past dead center position and cause contact 75' to flip into engagement with contacts 74', thereby closing the motor circuit. As soon as the cam engaging head 24 of valve 2 has advanced the entire distance represented by line 'a', the other pin 82 has engaged spring 83 and moved it past dead center position, as illustrated in Fig. 18, to open time limit switch 4. It will, of course, be seen that when the pin 82 moves spring 83 past this dead center position, tension will be applied to arm 81 to pivotally swing it upwardly about its pivotal mounting on member 82'. Control circuit 12 is now open and the current flow having ceased, the temperature at heat coil 11 will lower to allow bellows 5 to contract. Downward movement of member 6 withdraws pin 82 from engagement with spring 83 to allow switch 4 to again close, thereby limiting the movement of the bellows. If the thermostat 14 is still closed, the circuit is completed by switch 4 being again closed, and the current flow once more causes heat coil 11 to develop heat so as to expand bellows 5. The result is that switch 4 is again opened when the bellows 5 expands. This operation is repeated until thermostat 14 opens, whereupon the apparatus returns to its non-operating position, as illustrated in Fig. 16. In so doing, however, the cam 92 is so arranged as to cause the gas valve 2 to remain open momentarily after the opening of the motor blower, by the engagement of cam surface 97 with head 24. Any tendency of the motor blower to extinguish the pilot flame is prevented and this pilot flame is again reduced to non-operating size by the cam 92 releasing the head 24. In the downward movement of member 6, the head 24 is caused to ride along the cam engaging edge 95 of cam 92, thereby causing this cam to move to the left against the tension of spring 93 until head 24 reaches the portion 96 of the cam. Head 24 then rides over cam surface 97 of portion 96, and is depressed to open valve 2. It will be remembered that when the system is being shut down, it is not essential that valve 2 be held open as long as when the system is first starting. When the system first starts, it is essential that the gas valve be opened to increase the pilot flame before the motor driven blower is started and also that this valve 2 be retained open a certain length of time after the motor driven blower has started, in both cases to prevent the pilot flame from being extinguished. The sudden rush of mixture past the pilot jet into the nozzle is apt to extinguish the flame as before explained. It is, of course, preferable to retain this pilot flame at an expanded size after the initial flow of the mixture into the nozzle for a predetermined length of time so as to insure ignition of the mixture. On the other hand, when the system is shut down, the sudden stopping of the mixture flow is also apt to extinguish the pilot flame.

It will be noted in Figs. 16 to 19, inclusive, that member 6 at the right-hand edge is struck upwardly to form a stop 100, against which cam 92 abuts when held in normal position by spring 93.

From the foregoing description, it is apparent that I have provided a thermally controlled element subject to the heat developed by the current flow and arranged as to operate on a time limit principle. This element functions to operate circuit controlling devices for opening and closing a motor circuit and a control circuit, the control circuit serving to place the thermally controlled element in circuit with a thermostat located in the house for maintaining a certain pre-determined room temperature. It further functions to operate a valve member controlling the flow of gas to the pilot flame at the burner of the system. These parts are so arranged as to permit the time limit feature of the thermally controlled element to affect a certain sequence of operations whereby the motor switch will be closed only after the gas valve is operated to increase the flow at the pilot jet. The control circuit switch is opened after the thermally controlled element has traveled its required distance to allow the desired time interval to elapse. The control circuit switch is known as a time limit circuit breaker in that it will be opened immediately when the thermally controlled element has reached the end of its advancing movement. Furthermore, this time limit circuit breaker serves to test the line to determine the condition of the thermostat, and, as soon as the thermostat opens, the circuit is broken, and with the flow of current failing, the temperature will lower at the heat coil to allow the thermally controlled element to return to non-operating position and in so doing to first effect the opening of the gas valve to expand the pilot flame and thereafter to open the motor circuit, holding the pilot flame expanded for a certain period of time after the motor circuit is opened.

Certain advantages are obtained by the resulting time relation between the operation of the switches and gas valve which assure satisfactory operation of the regulator and efficient operation of the fuel burning system.

Without further elaboration, the foregoing will so fully explain the gist of my invention that others may, by applying current knowledge, readily adapt the same for use under varying conditions of service, without eliminating certain features which may properly be said to constitute the essential items of novelty involved, which items are intended to be defined and secured to me by the following claims.

I claim:

1. In a regulator for oil burning systems, the combination of a motor circuit having an electric switch therein, a thermostatically operated control circuit including an electrical heating element associated with said motor circuit, and switch actuating means controlled by the heat developed by the current flow in said heating element for opening and closing said motor circuit.

2. In a regulator for oil burning systems, the combination of a motor circuit having an electric switch therein, a thermostatically operated control circuit connected in parallel with said motor circuit, a heating element included in said control circuit, and means controlled by the heat developed by the current flow in said control circuit for closing said switch.

3. In a regulator for oil burning systems, the combination of a motor circuit having an electric switch therein, a thermostatically operated control circuit also having a switch and an electrical heating element therein, and means controlled by the heat developed by the current flow in said control circuit for first closing said motor circuit switch and thereafter opening said control circuit switch.

4. In a regulator for oil burning systems, the combination of a motor circuit, a thermostatically operated control circuit associated with said motor circuit whereby when the control circuit is closed the motor circuit is open, and means for opening and closing said circuits, said means being controlled by the heat developed by the current flow in the control circuit.

5. In a regulator for oil burning systems, the combination with a thermostat, of a motor switch, means including a heating coil in circuit with said thermostat for opening and closing said switch, said means being controlled by the heat developed by the current flow in the circuit when the thermostat closes, and a second switch operable by said means for opening the circuit to determine the opening period of said thermostat, said second switch serving to test the circuit by again closing whereby said thermally controlled element is prevented from returning to normal position until the thermostat breaks the circuit.

6. In a regulator for oil burning systems, the combination with a thermostat, of a motor switch, a thermally controlled element for opening and closing said switch, said element in circuit with said thermostat being controlled by the heat developed by the current flow in the circuit when said thermostat closes, and a second switch for limiting the movement of said thermally controlled element and engageable thereby for actuation.

7. In a regulator for oil burning systems, the combination with a thermostat, a thermally controlled element including a heating coil in circuit with said thermostat, a gas valve, and a motor switch, said thermally controlled element influenced by the heat in the coil for opening said gas valve in advance of closing said motor switch.

8. In a regulator for oil burning systems, the combination with a thermostat, a thermally controlled element in circuit with said thermostat and influenced by the heat developed by the current flow in the circuit, a gas valve and a motor switch both operated by said thermally controlled element, said gas valve being so arranged as to open in advance of the closing of said motor switch and to close a predetermined time after the switch is closed, and a time limit switch operable to determine the condition of said thermostat whereby to open the circuit if the thermostat is open.

9. In a regulator for oil burning systems, the combination with a thermostat, a thermally controlled element in circuit with said thermostat and influenced by the heat developed by the current flow in the circuit, a gas valve and a motor switch, both operated by said thermally controlled element, said gas valve being so arranged as to open in advance of the closing of said motor switch and to close a predetermined time after the switch is closed.

10. In a regulator for oil burning systems, the combination with a thermostatic circuit, of a motor switch, a gas valve, an expansible and contractible bellows influenced by the heat developed by the current flow in the circuit, an arm extending from said bellows, and means on said arm for operating both said switch and said valve, said means being so disposed as to open and close said switch and valve in a predetermined time relation.

11. In a regulator for oil burning systems, the combination with a thermostatic circuit, of a motor switch, a gas valve, an arm for engaging said motor switch and said gas valve whereby a predetermined time interval elapses between the opening of the valve and the closing of the motor switch, and means influenced by the heat developed in the circuit by the current flow for controlling the movement of said arm.

12. In a regulator for oil burning systems, the combination with a thermostatic circuit, of a motor switch, a gas valve, a control switch, an arm for actuating said valve and switches, and means influenced by the heat developed in the circuit by the current flow for controlling the movement of said arm, said arm opening said gas valve with a predetermined time interval elapsing before said motor switch is closed, the operation of said control switch having a predetermined time relation to the closing of said motor switch.

13. In a regulator for oil burning systems, the combination with a thermostatic circuit, of a motor switch, a gas valve, a control switch, an arm for actuating said valve and switches, means for controlling the advance and return movements of said arm, and a cam member actuated by said arm for engaging said valve, said cam member having a longer time engagement with said valve on the advancing movement of said arm than on the returning movement thereof.

14. In a regulator for an oil burning system, the combination with a thermostat, a motor switch for controlling the starting and stopping of a motor driven blower, a gas valve normally supplying a limited flow of gas to a pilot light, an electrical heating element in circuit with said thermostat, and means influenced by the heat effects of said element for operating said switch and said valve, said means functioning to open said valve and increase the pilot flame before said switch is closed and the motor driven blower started, and to hold said valve in open position until the motor driven blower has reached normal operation.

15. In a regulator for an oil burning system, the combination with a thermostat for controlling the operation thereof, a motor switch for controlling the starting and stopping of a motor driven blower, a gas valve normally supplying a limited flow of gas to a pilot light, and electrical heating element associated with said thermostat and a thermally controlled element influenced by the heat effects of the current flow in said electrical heating element for actuating said valve and motor switch in a predetermined time sequence whereby the pilot light may be expanded during the initial supply of fuel to the burner and thereafter contracted while the system remains in normal operation.

16. In a regulator for an oil burning system, the combination with an electric circuit having a thermostat for controlling the operation thereof, a motor switch in circuit with said thermostat for controlling the starting and stopping of a motor driven blower, a gas valve normally supplying a limited flow of gas to a pilot light, and a thermally controlled element associated with said thermostat and influenced by the heat effects of the current flow in the circuit for actuating said valve and motor switch, a member movable by said thermally controlled element, a cam on said member for engaging said gas valve, and a projection on said member for engaging said switch.

17. In a regulator for an oil burning system, the combination with a thermostat for controlling the operation thereof, a motor switch for controlling the starting and stopping of a motor driven blower, a gas valve normally supplying a limited flow of gas to a pilot light, and a thermally controlled element influenced by the heat effects of the current flow in the circuit of said thermostat for actuating said valve and motor switch, a member movable by said thermally controlled element, a cam on said member for engaging said gas valve during the advance and return movements of the member, and means for mounting said cam so as to have a greater time engagement with said gas valve on the advance movement of said member than on the return movement.

18. In a regulator for an oil burning system the combination of an electric circuit having a motor switch therein, a gas valve and a thermally controlled element having a heat coil in circuit with said motor switch and influenced by the heat effects of the current flow in the circuit for actuating said switch and valve, a member secured to and movable by said thermally controlled element, and cam means on said member for actuating said valve comprising a pivotally mounted portion adapted for engagement with said valve on the advancing movement only of said member and a stationary portion adapted for engagement with said valve both on the advancing and return movements of said member.

19. In a regulator for an oil burning system the combination of an electric circuit having a motor switch therein, a gas valve and a thermally controlled element having a heat coil in circuit with said motor switch and influenced by the heat effects of the current flow in the circuit for actuating said switch and valve, a member secured to and movable by said thermally controlled element, a movable cam and a stationary cam on said member for actuating said valve, both of said cams engaging said valve to hold it open on the advancing movement of said member, said movable cam having means for rendering its engagement with said valve ineffective on the return movement of said member whereby said stationary cam only engages and opens said valve.

20. In a regulator for an oil burning system the combination of an electric circuit having a motor switch therein, a gas valve and a thermally controlled element having a heat coil in circuit with said motor switch and influenced by the heat effects of the current flow in the circuit for actuating said switch and valve, a member secured to and movable by said thermally controlled element, cam means disposed on one side of said member to open and close said valve on the advancing movement of said member, and a projection disposed on the other side of same member for holding said switch closed only after said member has advanced a predetermined distance, said projection continuing to hold said switch in open position on the return movement of said member until substantially the same point in the travel of said member is reached, said cam means being arranged on the return movement of said member to hold said valve open while said switch is closed.

21. In a regulator, a housing, an expansible and contractible bellows disposed therein, a heating element therefor, a gas valve, a pair of switches, one of said switches controlling said heating element, a member movable by said bellows for actuating said control switch whereby said bellows will have a time limit advancing movement, and means on said member for actuating the other switch and said valve before said control switch is actuated.

22. In a regulator, a housing, an expansible and contractible bellows disposed therein, a heating element therefor, a gas valve, a pair of switches, one of said switches controlling said heating element, a member movable by said bellows for opening said control switch and thereby rendering said heating element ineffective, said member operable to open and close said valve and to close said other switch before opening said control switch.

23. In an automatic time limit regulator, a thermally controlled element, a valve member, and a pair of electric switches connected in parallel, one of said switches serving as a control switch to control said thermally operated element, and a member movable by said thermally controlled element for actuating said valve member and both switches, the control switch being actuated thereby when said thermally controlled element moves a predetermined distance whereby to effect a time limit operation between said switches and said valve.

24. In an automatic time limit regulator, a thermally controlled element, a source of heat for said element, a valve member, a pair of electric switches, one of said switches serving as a control switch to control said thermally operated element and to render said source of heat ineffective when open, and a member movable by said thermally controlled element for actuating said valve member and both of said switches.

25. In an automatic time limit regulator, a thermally controlled element, a heating coil for said element, a valve member, a pair of switches connected in circuit with each other, one of said switches connected in series with said heating coil and serving as a control switch to control said thermally controlled element, and a member movable by said thermally controlled element for actuating said valve member and both switches, said control switch adapted to be opened by said member to render said heating coil temporarily ineffective so as to effect a time limit operation of the regulator.

26. In an automatic time limit regulator, the combination of a pair of switches connected in parallel, a valve member, a thermally controlled element, a heating coil therefor, a thermostat connected in circuit with said heating coil, one of said switches serving as a control switch to control the movement of said thermally controlled element and also connected in circuit with said heating coil, the closing of said thermostat causing said thermally controlled element to actuate first said valve member, then the other of said switches and thereafter release said valve member, and finally actuate said control switch.

27. In an automatic time limit regulator, the combination of a pair of switches connected in parallel, a valve member, a thermally controlled element, a heating coil therefor, a thermostat connected in circuit with said heating coil, one of said switches serving as a control switch to control the movement of said thermally controlled element and also connected in circuit with said heating coil, the closing of said thermostat causing said thermally controlled element first to open said valve member, then to close the other of said switches and thereafter close said valve member, and finally to open said control switch, the opening of said thermostat rendering said heating coil inactive whereby said thermally controlled element functions first to close said control switch, and then to hold said valve member opened until said other switch is opened.

In witness whereof, I have hereunto subscribed my name.

LAURENCE M. PERSONS.